3,230,261
PROCESS FOR PRODUCING TRITIATED ORGANIC COMPOUNDS

Paul M. Yavorsky, Monongahela, and Everett Gorin, Pittsburgh, Pa., assignors, by mesne assignments, to the United States of America as represented by the United States Atomic Energy Commission
No Drawing. Filed May 4, 1962, Ser. No. 192,308
4 Claims. (Cl. 260—593)

This invention relates to a novel tritiating reagent namely, boron trifluoride-tritiated phosphoric acid complex. More particularly, this invention relates to a novel triating reagent and a process for using tritiating reagent to exchange tritium for hydrogen in particular organic compounds.

Our novel tritiating reagent, namely, boron trifluoride—tritiated phosphoric acid complex, is sometimes hereinafter designated for convenience purposes by the empirical formula $TH_2PO_4 \cdot BF_3$. This is not meant to limit our reagent to containing a single tritium atom per molecule because our tritiating reagent may comprise one, two, or three tritium atoms per molecule. Normally, the reagent comprises a mixture of $TH_2PO_4 \cdot BF_3$, $T_2HPO_4 \cdot BF_3$, $T_3PO_4 \cdot BF_3$, and $H_3PO_4 \cdot BF_3$ as is hereinafter more fully discussed.

By "tritiating reagent," we mean a compound which contains tritium (the radioactive hydrogen isotope of atomic weight or mass 3) and which causes the tritium contained therein to replace hydrogen contained in other compounds, particularly certain organic compounds. The mechanism of exchanging tritium for hydrogen is commonly referred to as "hydrogen isotope exchange labeling."

In recent years, there has developed a widespread interest in producing radiotracers, particularly radio tracers of organic compounds. Radiotracers, as the name implies, are radioactive compounds which are normally used, for example, in the chemical industry to follow the course of a particular compound in a chemical process; or in biological studies, to follow the path of a compound as it travels through animal or human bodies. The location of a radiotracer is determined by its emission of radiations.

Since all organic compounds contain the element hydrogen, one obvious means for producing radiotracers of organic compounds is to substitute tritium for the hydrogen contained therein. There are two basic methods for producing tritiated organic compounds, i.e., an organic compound containing at least one tritium atom per molecule. Firstly, tritium may be used in place of hydrogen in the initial synthesis of the organic compound; and secondly, tritium may be exchanged for hydrogen in an existing organic compound. The present invention is concerned with the latter method, i.e., hydrogen isotope exchange labeling. When the actual composition of an organic compound is unknown, synthesis is precluded and hydrogen isotope exchange labeling is essentially the only means for producing the tritiated tracers.

Presently, the most widely used hydrogen isotope exchange labeling processes are the Wilzbach process and ordinary acid exchange processes. The Wilzbach process comprises exposing the organic compound to be tritiated to several curies of tritium gas in a sealed reaction vessel for several days. The large quantity of low energy beta radiation emitting from the tritium apparently displaces hydrogen in molecular or atomic form from the compound, and then tritium from the surrounding atmosphere fills the resulting vacancies, thereby yielding the desired tritiated compound. Unfortunately, radiation from the tritium also disrupts the internal structure of the organic compound being tritiated and thus leads to the production of new chemical species of the organic compound. These new chemical species are highly tritiated in that the disrupture sites readily pick up tritium from the surrounding atmosphere. Obviously, before the tritiated products can be used as radiotracers, these impurities, i.e., the new chemical species, must be removed. For example, if it is desired to tritiate a drug in order to follow the path of the drug in the human body, tritiated impurities must not be present. The tritiated impurities may behave quite differently from the parent organic compound from which they were derived and, therefore, the results of the experiment will be meaningless. More importantly, however, is that some of the triated impurities may actually be harmful to the human body. Removing the tritiated impurities from the desired tritiated organic compound is frequently very difficult and very costly.

The ordinary acid exchange processes comprise contacting the organic compound to be tritiated with tritiated acid, e.g., tritiated sulfuric acid, tritiated phosphoric acid, and the like. The tritiated acid acts as a catalyst whereby hydrogen atoms are displaced from the organic compound and the tritium contained in the acid replaces the displaced hydrogen atom. In contrast to the Wilzbach process, the acid exchange processes produce a much smaller amount of triated impurities thereby substantially minimizing the costly purification steps required to recover the desired tritiated organic compound in a pure state. The primary disadvantage with the acid exchange processes, however, is that the exchange of tritium for hydrogen is extremely slow, particularly if the acid exchange reaction is carried out at ambient temperatures. Frequently, the acid exchange processes take 6 to 7 times as much time to achieve the same amount of tritiation as the Wilzbach process. For example, instead of tritiating an organic compound such as naphthalene (to the same specific activity) in 10 days by the Wilzbach process; ordinary acid exchange processes will take more than 60 days. If desired, however, the rate of the ordinary acid exchange reaction may be accelerated by increasing the temperature at which the reaction is conducted. Unfortunately such increase in temperature frequently leads to undesirable side reactions for example, when tritiated sulfuric acid is used, sulfuration takes place.

It is extremely desirable that a hydrogen isotope exchange labeling process be developed such that (1) An essentially pure tritiated organic compound is obtained without the necessity of subsequent purification steps;

(2) An organic compound is tritiated in several hours rather than several days;

(3) Expensive and involved radioactive gas handling equipment is not necessary to accomplish the desired tritiation;

(4) Smaller and thus less hazardous amounts of tritium are used to accomplish the desired tritiation; and (5) The specific activity i.e., the curies per gram of material is easily controlled, with very high specific activities obtainable when desired.

Such a process, embodying the above advantages, heretofore has not been available.

Accordingly, it is the primary object of this invention to provide a novel tritiating reagent and a hydrogen isotope exchange labeling process employing the novel triating reagent such that the afore-mentioned advantages are obtained.

In accordance with our invention, we have produced a novel tritiating reagent, namely, boron trifluoride-tritiated phosphoric acid complex.

Our novel tritiating reagent may be used to tritiate any acidic or neutral organic compound containing at least one hydrogen atom selected from the group consisting of aromatic hydrogen, tertiary hydrogen, and alpha hydrogen, as hereinafter more fully explained. In particular, our novel reagent is especially suitable for tritiating acidic and neutral organic compounds containing aromatic hydrogen atoms.

In contrast to the Wilzbach hydrogen isotope exchange labeling process, which replaces tritium for hydrogen in organic compounds by beta emissions causing the displacement of hydrogen; our hydrogen isotope exchange labeling process, like the ordinary acid exchange processes, replaces tritium for hydrogen in organic compounds by a catalytic type of mechanism. The $BF_3$ portion of the $TH_2PO_4 \cdot BF_3$ complex acts as a catalyst by making the complex extremely acidic, which in turn causes hydrogen atoms to be displaced from the organic compound and tritium contained in the tritiating reagent ($TH_2PO_4 \cdot BF_3$) to replace the displaced hydrogen atom. A very likely, but not exclusive, reaction mechanism for exchange labeling with our tritiating reagent is as follows:

LABELING MECHANISM (A)
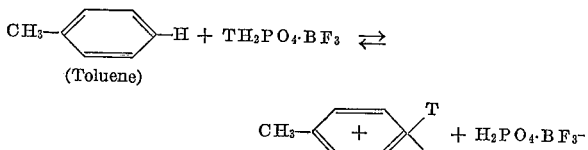

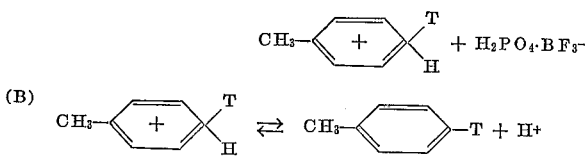

(C) 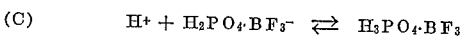

A full appreciation of the significant contribution which we have made to the hydrogen isotope exchange labeling art by discovering our novel reagent is illustrated best by the following:

(1) When our novel reagent is used to tritiate an organic compound, less tritiated impurities are produced than by either the Wilzbach process or ordinary acid exchange processes.

(2) In contrast to the Wilzbach process which takes days and even weeks or the acid exchange processes which take months to accomplish the desired amount of tritiation, our reagent can accomplish the same amount of tritiation in a matter of a few hours and in some cases a few minutes.

Because our novel tritiating reagent produces essentially no tritiated impurities when it is used, costly after-purification steps are thus eliminated. The primary reasons why our tritiating process does not cause formation of tritiated impurities is that the desired amount of tritiation normally is accomplished in a few hours; relatively small amounts of tritium are used; and most of the tritium radiation energy is dissipated in the stable tritiating reagent.

An additional important feature inherent in the use of our reagent is that expensive and somewhat involved radioactive gas handling system such as are used in the Wilzbach process are eliminated, and in place thereof simple, stirred contacing vessels are all that is needed. For example, if a liquid organic compound is to be tritiated, all that is necessary when using our reagent is to contact the reagent with the organic liquid.

Furthermore, when our reagent is used, the specific activity of the organic compound to be tritiated is easily controlled, for example, by controlling the ratio of tritiating reagent to organic compound and by controlling the amount of tritium in the tritiating reagent itself. The latter is adjusted by the amount of tritium in the water used to make the reagent, as hereinafter explained.

As previously mentioned, our novel tritiating reagent ($TH_2PO_4 \cdot BF_3$) will tritiate any acidic or neutral organic compound containing at least one hydrogen atom selected from the group consisting of aromatic hydrogen atoms, tertiary hydrogen atoms, and alpha hydrogen atoms.

AROMATIC HYDROGEN

By aromatic hydrogen, we mean the hydrogen atoms directly attached to the carbon atoms in a benzene nucleus. for example, benzene contains six aromatic hydrogen atoms, naphthalene contains eight aromatic hydrogen atoms, and toluene contains fixe aromatic hydrogen atoms. The three hydrogen atoms comprising the methyl group attached to the benzene ring in the compound toluene are, of course, not aromatic hydrogen atoms.

TERTIARY HYDROGEN

By tertiary hydrogen, we mean the hydrogen atoms attached to tertiary carbon atoms, i.e., the hydrogen atoms attached to a carbon atom which is attached to three other carbon atoms. For example, isobutane has one tertiary hydrogen atom, and decalin has two tertiary hydrogen atoms.

ALPHA HYDROGEN

By alpha hydrogen, we mean the hydrogen atoms attached to an alpha carbon atom, i.e., a carbon atom which is attached directly to an activating group such as a carbonyl group. For example, acetone contains six alpha hydrogen atoms, and cyclohexanone contains four alpha hydrogen atoms.

According to the present invention, our new tritiating reagent ($TH_2PO_4 \cdot BF_3$) is prepared by mixing equimolar amounts of boron trifluoride and tritiated 100 percent phosphoric acid. For example, when boron trifluoride gas is bubbled through tritiated 100 percent phosphoric acid, which is a liquid, the boron trifluoride continually is absorbed in the acid until an equimolar amount has been added. An additional boron trifluoride is bubbled through the liquid, the gas passes through the liquid and is completely recovered overhead. Thus our new tritiating reagent, which is a clear, colorless liquid, is an equimolar reaction product of boron trifluoride and tritiated 100 percent phosphoric acid. Sometimes a clear but slightly amber-colored liquid is obtained, due likely to traces of airborne impurities being present in the reagent.

Our boron trifluoride—tritiated phosphoric acid complex is generally similar to the conventional boron trifluoride—phosphoric acid complex except for the replacement of at least one hydrogen atom in phosphoric acid by tritium.

Any conventional means may be used for producing the tritiated 100 percent phosphoric acid, for example, stoichiometric amounts of tritiated water and phosphorus pentoxide may be reacted together to yield tritiated 100 percent phosphoric acid.

The number of tritium atoms contained in the tritiated 100 percent phosphoric acid will determine the number of tritium atoms contained in the final complex. The number of tritium atoms in the tritiated 100 percent phosphoric acid is determined by the number of tritium atoms contained in the tritiated water which is used to make the tritiated phosphoric acid.

The reagent ($TH_2PO_4 \cdot BF_3$) is a very dense liquid, (specific gravity 1.87), immiscible with all hydrocarbons, but soluble in organic compounds containing oxygen, nitrogen or sulfur. The reagent must never be stored in stoppered glassware for an extended period of time, as an imperfect seal allowing water-vapor absorption will lead to the formation of hydrofluoric acid which will then attack the glass sufficiently to dissolve the container. In general, polyethylene ware is used for long-time storage of the reagent as well as for some tritiating experiments that extend beyond two or three days. If the tritiating experiment is to last a day or less, then glassware may be used, if desired.

When it is desired to tritiate a highly volatile aromatic compound, polyethylene vessels should not be used if the experiment is to last for more than a few hours since such aromatic compounds diffuse through the polyethylene vessel walls, and thus some of the radiotracer will be lost. In such experiments, it is best to place the highly volatile compound and tritiating reagent in a glass vessel and melt-seal the opening thereof. Thus entrance of moisture and loss of volatile radiotracer will be prevented.

In order to tritiate an acidic or neutral organic compound containing at least one aromatic hydrogen atom, tertiary hydrogen atom, or alpha hydrogen atom, $TH_2PO_4 \cdot BF_3$ simply is contacted with the organic compound in any conventional type contacting vessel. For example, if the organic compound is a liquid, the liquid organic compound and $TH_2PO_4 \cdot BF_3$ merely are added to a round-bottom flask and stirred until the desired amount of hydrogen isotope is exchanged. If the organic liquid is a hydrocarbon, the product tritiated compound is separated from the reagent by simple decantation. On the other hand, if the organic compound contains oxygen ($TH_2PO_4 \cdot BF_3$ is soluble in oxygen-containing organic compounds), then we have found the addition of a few drops of water will separate the tritiated product and the tritiating reagent into two phases such that simple decantation may be used to separately recover the materials, provided the organic compound is not water soluble.

Other conventional chemical or physical separation techniques also may be used to recover particular radiotracers from the tritiating reagent after the exchange labeling experiment is finished. Such techniques are, for example, fractionational distillation, liquid phase extraction, and formation of more easily separable chemical derivatives. These techniques usually are reserved for water-soluble organic compounds.

Conventional contacting vessels which normally are used to contact liquids and solids, and liquids and gases may be used when it is desired to tritiate solid organic compounds and gaseous organic compounds, respectively. Labeling of solids is accelerated if the solids are dissolved in a solvent which is not susceptible to labeling, and the solution contacted with the reagent.

It is important to note that no water should be present during tritiation as we have found that water destroys the reagent ($TH_2PO_4 \cdot BF_3$), thereby preventing the hydrogen isotope exchange labeling from taking place. Water has a greater affinity for $BF_3$ than does the tritiated 100 percent phosphoric acid, and thus the presence of water causes a severance of our $TH_2PO_4 \cdot BF_3$ complex. One molecule of water can destroy up to 8 molecules of the tritiating reagent.

In general, the tritiating reagent is contacted with the organic compound to be tritiated at temperatures below 100° C., preferably room temperature. It is highly undesirable to conduct the tritiation at temperatures above 100° C. Above 100° C., the reagent ($TH_2PO_4 \cdot BF_3$) tends to become too reactive, thereby cracking the organic compound being tritiated into new molecular species; and thus to obtain a pure tritiated organic compound extensive purification is necessary, such as with the Wilzbach process. Preferably, atmospheric pressure is maintained during tritiation; however, if desired, elevated pressure may be used. For example, if a normally gaseous organic compound is desired to be tritiated, elevated pressure sufficient to maintain the organic compound as a liquid may be used.

We have found that in most instances the desired tritiation will be accomplished in several hours at room temperature and atmospheric pressure. However, if shorter residence times are desired, then the temperature may be increased, but not over 100° C.

The amount of tritiating reagent used during tritiation is dependent primarily upon the desired specific activity (curies per gram) of the organic compound being tritiated. For example, as the ratio of tritiating reagent to organic compound is increased, the specific activity of the resulting radiotracer will be increased. Normally, a 1 to 1 weight ratio of reagent to organic compound will be sufficient to completely tritiate all aromatic, tertiary, and alpha hydrogen atoms contained in the organic compound being tritiated. If high specific activity radiotracers are desired, the tritiated water used in making the reagent should be of initial high specific activity.

We have found that our reagent will not tritiate a basic or an amphoteric organic compound. When such compounds are used, the $TH_2PO_4 \cdot BF_3$ reacts and forms salts with the basic groups. These salts are tritiated very slowly, if at all. The exact reason for this is not presently known. Therefore, the preferred compounds to use with out novel tritiating reagent ($TH_2PO_4 \cdot BF_3$) are acidic and neutral organic compounds containing at least one hydrogen atom selected from the group consisting of aromatic hydrogen, tertiary hydrogen, and alpha hydrogen.

We have also found that while all acidic and neutral organic compounds containing at least one aromatic, tertiary, or alpha hydrogen atom will be tritiated by our novel reagent, such of the above organic compounds which are susceptible to acid induced polymerization normally will be polymerized when contacted with our tritiating reagent, thereby making it difficult to recover the pure radiotracer. Examples of compounds which are susceptible to such acid induced polymerization are olefins, acetylenes, and those compounds that isomerize to olefinic structures in acid media. The above-polymerizable compounds can be prevented from polymerizing by using dilute solutions of such compounds in inert (non-tritiating) solvents during the tritiating reaction. In this manner, pure radiotracers of such compounds may be recovered.

Example 1

In the following Table I is contained a comparison of our novel tritiating reagent with the Wilzbach process and with two ordinary acid exchange processes. Tritiated phosphoric acid was used in one acid exchange process and tritiated sulfuric acid in the other. Naphthalene was used as the organic compound to be tritiated in all experiments and in all four experiments the naphthalene was tritiated to the same specific activity.

TABLE I

|  | Wilzbach Process | $TH_2PO_4$ | $THSO_4$ | $TH_2PO_4 \cdot BF_4$ |
| --- | --- | --- | --- | --- |
| Radiochemical Purity [1]. | Less than 33%. | Essentially 100%. | Essentially 100%. | Essentially 100%. |
| Reaction Time | 10 days | 67 days | 67 days | 12 hours. |
| Amount of Tritium used. | 10 curies | 2 curies | 2 curies | 2 curies. |

[1] Radiochemical Purity means the percentage of radiotracers that are produced by tritiation which are identical, except for the substitution of tritium atom or atoms for hydrogen atom or atoms, to the origianl compound to be tritiated.

From the above Table I, it can be seen that more than 67 percent of the naphthalene was converted to new chemical species in the Wilzbach process. Not only is the loss of naphthalene prohibitive, but the cost of separating the 33 percent tritiated naphthalene from the tritiated chemical impurities also is very costly.

Example 2

The following Table II contains a list of eleven compounds that were contacted individually with our tritiating reagent. In all eleven experiments the reagent and compound were contacted at 23° C. and atmospheric pressure. By comparing specific activity before and after purification in Experiments 1 to 10, it is readily detected that essentially no tritiated chemical impurities were produced.

Experiments 1 to 7 are examples of compounds containing aromatic hydrogen atoms.

Experiments 8 and 9 are examples of compounds containing tertiary hydrogen atoms.

Experiment 10 is an example of a compound containing an alpha hydrogen atom.

Experiment 11 is an example of a basic organic compound which is not tritiated by our reagent.

TABLE II

| Experiment | Compound | Aromatic Hydrogen Atom | Alpha Hydrogen Atom | Tert. Hydrogen Atom | Reaction Time (Hrs.) | Specific activity before purification (mc./gm.) | Specific activity after purification (mc./gm.) |
|---|---|---|---|---|---|---|---|
| 1 | Benzene | 6 | None | None | 6.0 | 106.6 | 108.2 |
| 2 | Toluene | 5 | None | None | 6.5 | 550 | 554 |
| 3 | "Tetralin" | 4 | None | None | 5.5 | 536 | 531 |
| 4 | Naphthalene | 8 | None | None | 7.0 | 1422 | 1440 |
| 5 | Anisole | 5 | None | None | 6.0 | 146 | 146 |
| 6 | Phenol | 5 | None | None | 6.0 | 87.5 | 87.0 |
| 7 | o-Cresol | 4 | None | None | 6.0 | 65.2 | 65.9 |
| 8 | Methylcyclohexane | None | None | 1 | 6.0 | 9.25 | 9.36 |
| 9 | "Decalin" | None | None | 2 | 6.0 | 32.20 | 31.4 |
| 10 | 2-Heptanone | None | 5 | None | 6.0 | 21.7 | 21.7 |
| 11 | Pyridine | 5 | None | None | 6.0 | 0 | 0 |

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. An improved process for producing tritiated organic compounds, which comprises contacting an organic compound selected from the group consisting of neutral and acidic organic compounds selected from the group consisting of organic compounds containing no elements other than carbon, hydrogen, and oxygen, said organic compound being selected from the group consisting of:
   (a) aromatic organic compounds having at least one hydrogen atom attached to the benzene nucleus of the compound;
   (b) organic compounds containing at least one tertiary carbon atom having a hydrogen atom attached to the tertiary carbon atom, said tertiary carbon atom having three other carbon atoms attached directly to the tertitary carbon atom;
   (c) organic compounds containing an alpha carbon atom, said alpha carbon atom having at least one hydrogen atom attached thereto, said alpha carbon atom being attached directly to another carbon atom having an activating group attached thereto, with boron trifluoride-tritiated phosphoric acid complex at a temperature below 100° C. in the absence of water to yield a tritiated organic compound.

2. An improved process for producing tritiated compounds, which process comprises contacting an organic compound selected from the group consisting of organic compounds containing no elements other than carbon, hydrogen and oxygen, said organic compound being selected from the group consisting of:
   (a) neutral organic aromatic compounds, and
   (b) acidic aromatic organic compounds; said organic aromatic compounds having at least one hydrogen atom attached to the benzene nucleus of the aromatic compound with boron trifluoride-tritiated phosphoric acid complex at a temperature below 100° C. in the absence of water to yield a tritiated organic compound.

3. An improved process for producing tritiated organic compounds comprising contacting an organic compound selected from the group consisting of neutral and acid organic compounds, said organic compounds containing no elements other than carbon, hydrogen, and oxygen, at least one tertiary carbon atom having a hydrogen carbon atom attached to the tertiary carbon atom, said tertiary carbon atom having three other carbon atoms attached directly to the tertiary carbon atom, with boron trifluoride-tritiated phosphoric acid complex at a temperature below 100° C. in the absence of water to yield a tritiated organic compound.

4. An improved process for producing tritiated organic compounds comprising contacting an organic compound selected from the group consisting of neutral and acidic organic compounds, said organic compound having no elements other than carbon, hydrogen, and oxygen, at least one alpha carbon atom, said alpha carbon atom having at least one hydrogen atom attached to the alpha carbon atom, and said alpha carbon atom being attached directly to another carbon atom having an activating group attached thereto, with boron trifluoride-tritiated phosphoric acid at a temperature below 100° C. in the absence of water to yield a tritiated organic compound.

References Cited by the Examiner

UNITED STATES PATENTS

| | | |
|---|---|---|
| 2,452,139 | 10/1948 | Newton. |
| 2,667,403 | 1/1954 | Sowa _____ 23—14 |
| 2,829,029 | 4/1958 | Bachman et al. _____ 23—14 |
| 2,835,699 | 5/1958 | Fries _____ 260—504 |
| 2,915,362 | 12/1959 | Fried et al. _____ 23—204 X |
| 2,951,074 | 8/1960 | Chemerda et al. ___ 260—239.55 |

OTHER REFERENCES

Yavorsky et al.: Nuclear Science Abstracts 15, 22602 (Sept. 15, 1961).

LEON ZITVER, *Primary Examiner*.

BENJAMIN HENKIN, DANIEL D. HORWITZ, LORRAINE A. WEINBERGER, *Examiners*.

M. WEISSMAN, *Assistant Examiner*.